United States Patent [19]

Kojima et al.

[11] Patent Number: 4,488,536
[45] Date of Patent: Dec. 18, 1984

[54] WARM AIR BLOWING HEATER

[75] Inventors: Nobuyuki Kojima; Youichi Sekigawa, both of Kamo, Japan

[73] Assignee: Toshiba Heating Appliances Co., Ltd., Kamo, Japan

[21] Appl. No.: 436,795

[22] Filed: Oct. 26, 1982

[30] Foreign Application Priority Data

Mar. 10, 1982 [JP] Japan ................................ 57-37791

[51] Int. Cl.$^3$ ............................................ F24C 5/04
[52] U.S. Cl. ........................................ 126/96; 126/84; 126/99 D; 126/110 C; 431/315; 431/344
[58] Field of Search ............... 126/84, 86, 92 B, 102, 126/39 B, 92 C, 99 D, 110 C, 112, 116 A, 127, 77, 96, 105 R, 105 A, 109; 431/76, 315, 344

[56] References Cited

U.S. PATENT DOCUMENTS

| | | | |
|---|---|---|---|
| 2,972,475 | 2/1961 | Monroe | 126/110 C X |
| 4,271,815 | 6/1981 | Johnson | 126/77 X |
| 4,329,976 | 5/1982 | Jackson | 126/77 X |
| 4,357,929 | 11/1982 | Johnson | 126/96 |
| 4,372,286 | 2/1983 | Baker | 126/77 |
| 4,396,001 | 8/1983 | Ogino et al. | 126/110 C X |
| 4,406,613 | 9/1983 | Naito et al. | 431/76 |
| 4,412,809 | 11/1983 | Yamaguchi et al. | 431/76 |

FOREIGN PATENT DOCUMENTS 146944 11/1981 Japan ............................ 126/110 C
WO81/03218 11/1981 PCT Int'l Appl. ................. 126/77

Primary Examiner—Samuel Scott
Assistant Examiner—Kenichi Okuno
Attorney, Agent, or Firm—Oblon, Fisher, Spivak, McClelland & Maier

[57] ABSTRACT

A warm air blowing heater includes combustion equipment for burning fuel, and an air duct provided at a position away from a portion directly above the combustion equipment for blowing air from the heater into the room. The combustion equipment includes a burner chimney provided above a burner, and a reflecting plate is provided behind this burner chimney. The radiation heat of the combustion equipment is radiated directly and is also reflected on the reflecting plate to heat the room. The air duct does not disturb the rise of the combustion exhaust gas of the combustion equipment to form a smooth rising exhaust gas stream. When the air is blown from the air duct toward the front of the heater, the high temperature air in the upper portion of the heater is sucked. This high temperature air is mixed with the air blown from the air duct to allow the heater to blow warm air into the room. The blower motor may suck the air in the room and supply it to the air duct. When the blower motor, however, sucks the outdoor air and blows it from the air duct into the room, the air in the room can be simultaneously exchanged for good circulation.

7 Claims, 5 Drawing Figures

WARM AIR BLOWING HEATER

BACKGROUND OF THE INVENTION

The present invention relates to a heater which is capable of blowing warm air with blowing means in addition to combustion equipment.

In a conventional reflection type heater, combustion equipment is provided at the center of a box-shaped body which is opened on the front side. A reflecting plate is provided behind the combustion equipment in this heater. This reflecting plate serves to radiate and diffuse combustion heat forward from the combustion equipment. A heater of the type for blowing warm air in which blowing means is provided in such a reflection type heater has been proposed. A heater of this type is constructed to suck by a blower and to introduce the sucked air into a heat exchanger provided above the combustion equipment. In the heater, the combustion heat of the combustion equipment is applied via the heat exchanger to the sucked air, which is thus heated, and the warm air is blown from an air outlet. The heat exchanger is arranged directly above the combustion equipment to effectively heat the air fed by a blower. Stable combustion in the combustion equipment can be carried out in such a manner that exhaust gas discharged by combustion from the combustion equipment is smoothly raised by natural convection. In the conventional warm air blowing heater, the smooth rise of the exhaust gas from the combustion equipment was, however, disturbed due to the heat exchanger provided directly above the combustion equipment. Therefore, the combustion in the combustion equipment may become unstable, causing incomplete combustion of fuel.

SUMMARY OF THE INVENTION

It is an object of the present invention to provide a warm air blowing heater which is capable of effectively blowing warm air.

It is another object of the present invention to provide a warm air blowing heater which is capable of stably burning in combustion equipment in a structure so that exhaust gas produced by combustion in the combustion equipment can be smoothly raised.

According to an aspect of the present invention, there is provided a warm air blowing heater comprising: combustion equipment for burning fuel, a body of box shape including a front surface having an opening and housing said combustion equipment, a reflecting member provided behind said combustion equipment for reflecting combustion heat from said combustion equipment forwards, blowing means provided at the position away from a portion directly above said combustion equipment and in the upper part of the front surface of said body for blowing warm air from said body, which is mixed with the hot air from the upper portion of the body, and air supply means connected to said blowing means for supplying air thereto.

DETAILED DESCRIPTION OF THE PREFERRED EMBODIMENTS

The present invention will now be described in more detail with reference to the accompanying drawings.

Figure 1:
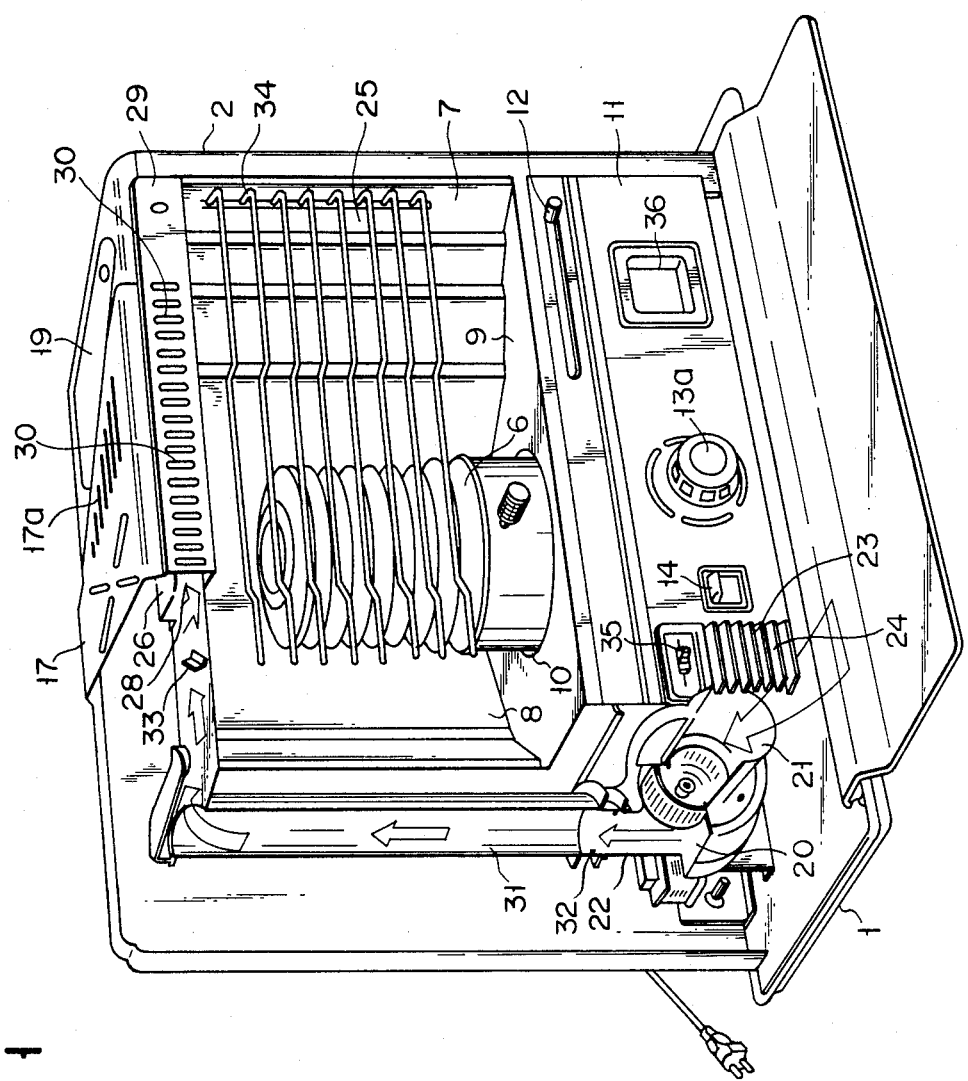
FIG. 1 is a partial section and perspective view showing the entirety of an embodiment of a warm air blowing heater according to the present invention.
Figure 2:
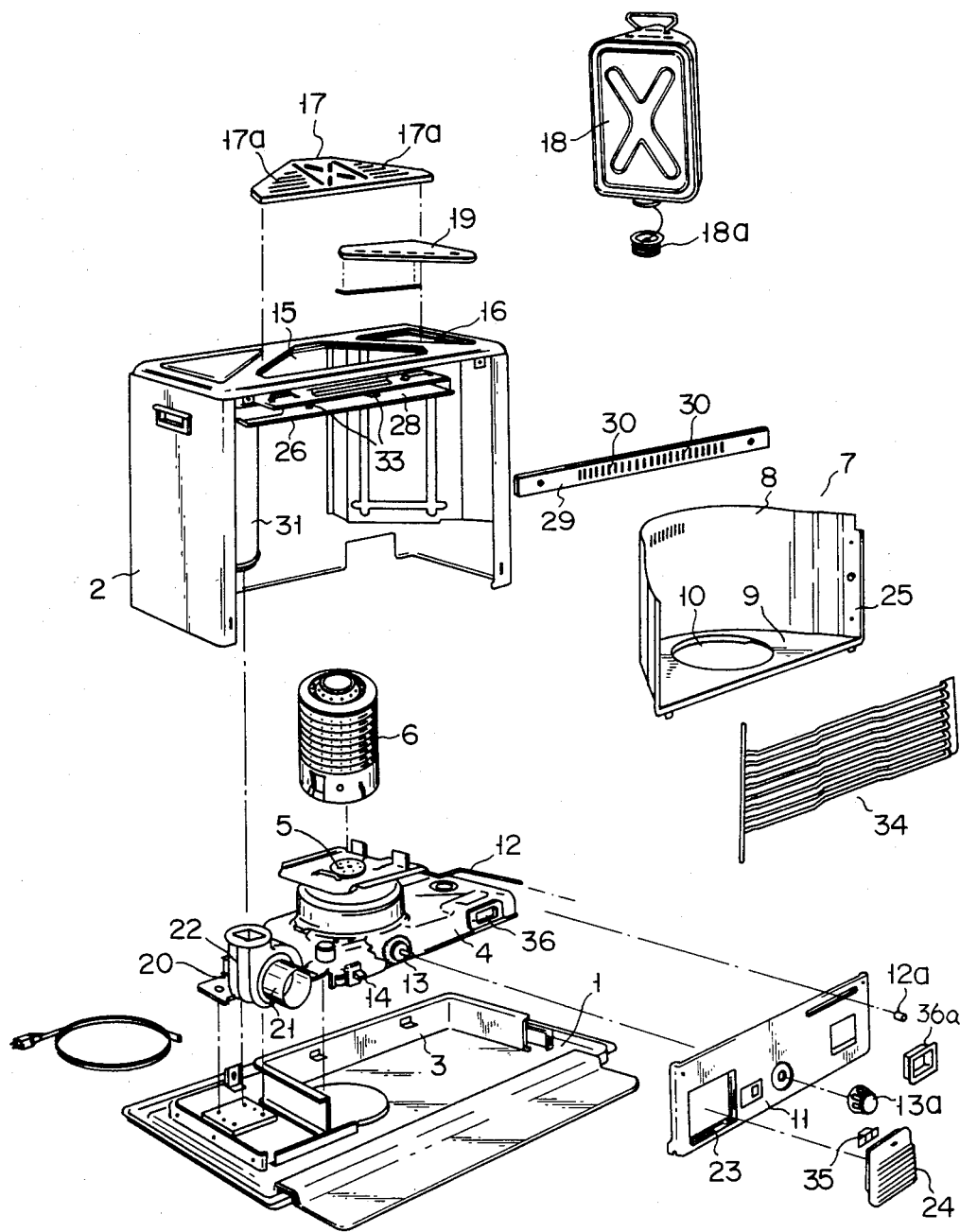
FIG. 2 is an exploded perspective view of an embodiment of the warm air blowing heater of the invention.

FIG. 1 shows the entire heater blowing warm air, and FIG. 2 shows the exploded state of the components of the heater. A frame 3 is securely fixed onto the upper surface of a base plate 1. A generally flat stationary tank 4 is secured to the frame 3. A blower motor 20 is mounted at the side of the tank 4. To the blower motor 20 are attached a suction pipe 21 which is horizontally mounted at its longitudinal axis and is directed at the opening of suction toward the front of the stove, and an exhaust pipe 22 which is vertically mounted at its longitudinal axis and is directed at the opening of exhaust toward the upper portion of the blower motor 20. A body 2 of a box shape which is opened at the front surface is installed on the base plate 1 so as to house the tank 4 and the blower motor 20 at both sides and back surface of the body 2. A burner 5 is mounted substantially at the center on the upper surface of the tank 4. A burner chimney 6 is mounted on the burner 5. The burner chimney 6 is tiltable with respect to the burner 5. The burner 5 is constructed to be ignited with the burner chimney 6 tilted. The combustion equipment is thus composed of the burner 5 and the burner chimney 6.

A reflecting member 7 is mounted at the inside of the body 2. The reflecting member 7 is composed of a reflecting back plate 8 bent in a V shape as seen from the upside and a reflecting bottom plate 9 secured to the lower edge of the back plate 8. A circular hole 10 of a diameter larger than the diameter of the burner chimney 6 is perforated substantially at the center of the bottom plate 9. In the state that these components are associated in the heater, the bottom plate 9 covers the upper portion of the tank 4, and the burner chimney 6 protrudes above the bottom plate 9 through the hole 10 of the bottom plate 9. The back plate 8 formed in a V shape is disposed at the sides of and behind the burner chimney 6 for reflecting the combustion heat of the burner chimney 6 forwards.

A front panel 11 for covering the front of the tank 4 and the blower motor 20 is mounted at the front edge of the bottom plate 9 of the reflecting member 7 and at both side ends of the body 2. A wick (not shown) is vertically movably mounted at the burner 5. A rotary shaft 13 as wick height control means for controlling the vertical position of the wick is mounted at the burner 5. The shaft 13 protrudes forwards through the front panel 11, and a knob 13a for controlling the combustion heat is mounted at the front end of the shaft 13. An ignition lever 12 for igniting the wick at its upper end when the burner chimney 6 is tilted is mounted on the burner 5. The end of the ignition lever 12 protrudes forward through the front panel 11, and the ignition knob 12a is mounted at the end of the lever 12. A fuel gauge 36 for indicating the volume of stored fuel in the tank 4 is mounted on the tank 4. The fuel gauge 36 can be visually observed through a window 36a perforated at the front plate 11. Fire extinguishing device (not shown) for instantaneously stopping the combustion of the wick is provided at the burner 5. A control knob 14 for the fire extinguishing device is projected forwards from the front panel 11 and is thus mounted at the fire extinguishing device. A suction port 23 is perforated at the position corresponding to the suction manifold 21 at the front panel 11. A louver 24 is mounted at the front panel 11 to cover the suction port 23. A blower control switch 35 for energizing or de-energizing the blower motor 20 is mounted on the upper portion of the louver 24.

Figure 3:
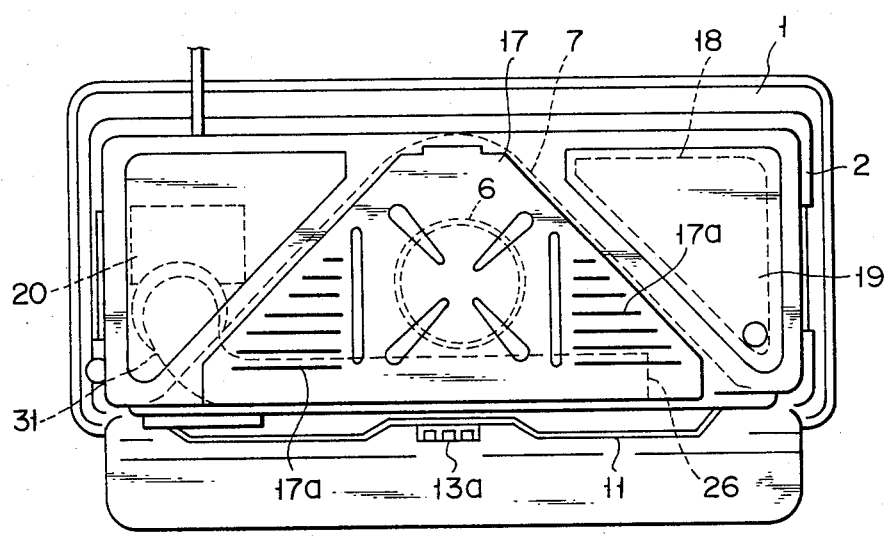
FIG. 3 is a plan view of the heater in FIG. 1.

An opening 15 of a substantially triangular shape is perforated at the portion of the upper surface of the body 2, which is corresponding to the inside of the back plate 8 of the reflecting member 7. An upper tray 17 is placed on the upper surface of the body 2 so as to be engaged with the opening 15. As shown in FIG. 3, a number of exhaust gas passage holes 17a are perforated at the upper tray 17. An inlet 16 of a substantially triangular shape is perforated at one of the sides corresponding to the outside of the back plate 8 of the upper surface of the body 2. A cartridge tank 18 which stores fuel such as kerosene can be contained within the body 2 by inserting the tank 18 through the inlet 16. Fuel is supplied from a plug 18a provided at the lower end of the tank 18 into the tank 4. A cover 19 which covers the inlet 16 is openably mounted on the upper surface of the body 2.

Figure 4:
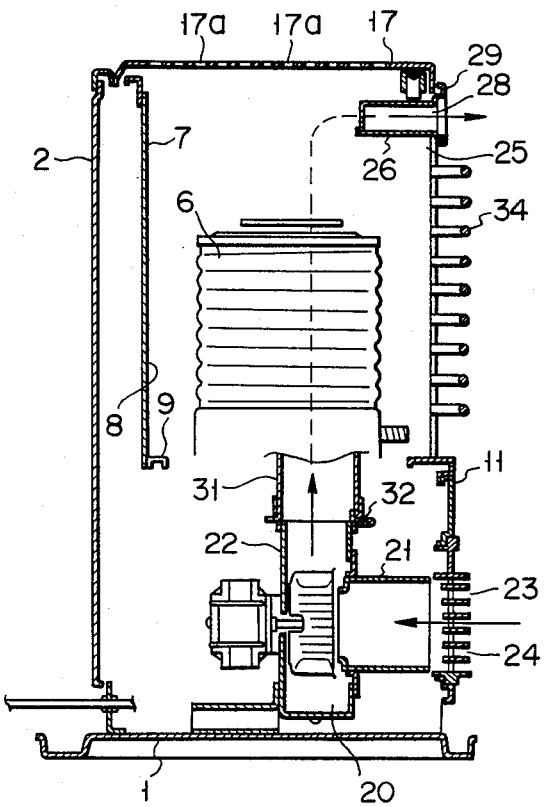
FIG. 4 is a partial sectional view of the heater in FIG. 1.
Figure 5:
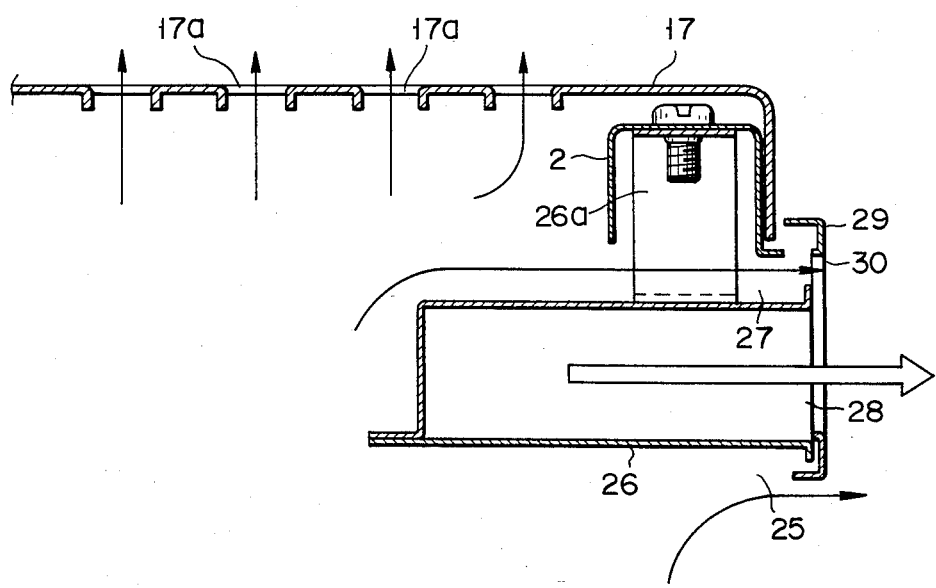
FIG. 5 is an enlarged sectional view of the vicinity of an air duct for the heater.

An air supply duct 31 is mounted at the corner opposite to the corner which contains the tank 18 which is outside the back plate 8 in the body 2. As shown in FIG. 4, the duct 31 is provided vertically on its longitudinal axis and connected to the exhaust manifold 22 through a packing 32 between the duct 31 and the manifold 22. As shown in FIG. 5, an air duct 26 is fixedly suspended at the front end of the upper surface of the body 2 by a supporting bracket 26a so as to be slightly spaced from the body 2. Then, the air duct 26 forms a vent space 27 with the body 2. The duct 26 has an opening 28 formed in a slender shape extending laterally to the heater along the front surface of the heater. The duct 26 is arranged at a position away from the portion directly above the burner chimney 6. The duct 26 is connected integrally to the upper end of the duct 31 at the side end of the duct 31. An air flowing plate 29 having a plurality of vertical slit-shaped air flowing ports 30 perforated therein is arranged in front of the opening 28 of the duct 26 and the vent space 27. Accordingly, the air sucked through the louver 24 and the suction manifold 21 is supplied by the blower motor 20 through the exhaust manifold 22 and the duct 31 to the duct 26 and is blown through the ports 30 of plate 29. Wind direction control plates 33 are provided on the inner bottom of the duct 26 to control the direction of the air blown from the opening 28 through the ports 30. A guard 34 having a plurality of lateral rods aligned in parallel with each other is mounted on the front surface of the body 2 to prevent the user's hand from coming into direct contact with the burner chimney 6.

The operation of the stove thus constructed will now be described. The wick of the burner 5 is ignited by the ignition knob 12a, and the height of the wick is controlled by turning the knob 13a to control the combustion heat. Thus, the wick inspires the surrounding air for combustion while sucking the fuel in the tank 4, and combustion continues at the upper end of the wick in the burner chimney 6. The exhaust gas of this combustion is raised toward the portion directly above the burner chimney 6. Since the duct 26 is arranged at the position away from the portion directly above the burner chimney 6, the combustion exhaust gas will rise without being disturbed by the duct 26. The exhaust gas then rises through the exhaust gas passage holes 17a of the tray 17 to form smooth and a stable rising exhaust gas stream. Therefore, combustion in the burner chimney 6 can take place stably without incomplete combustion. The radiation heat of the burner chimney 6 is reflected on the back plate 8 of the reflecting member 7 and is thus diffused forwards from the stove. The interior of the room is heated directly by the radiation heat of the burner chimney 6 and is also heated by the radiation heat of the burner chimney 6 reflected by the back plate 8. The room is also heated by the exhaust gas rising from the burner chimney 6 by natural convection and circulated in the room.

When the control switch 35 of the blower motor 20 is closed, the blower motor 20 is driven. Then, the blower motor 20 sucks the air in the room through the louver 24 and the suction manifold 21. The blower motor 20 supplies the sucked air through the exhaust manifold 22 and the duct 31 to the duct 26. The air fed from the blower 20 is blown into the room through the ports 30 of the plate 29 from the opening 28 of the duct 26 while being controlled in the wind direction by the control plate 33. Since the duct 26 is arranged at the position away from the portion directly above the burner chimney 6, the air blown from the duct 26 into the room is not heated directly by the combustion heat of the burner chimney 6. However, the high temperature air below the tray 17 is sucked toward the front of the heater through the vent space 27 by the pressure of the air to be blown from the opening 28 of the duct 26 through the ports 30 into the room. Accordingly, the air to be blown into the room from the ports 30 of the diffusion plate 29 is produced in the mixture of the air of relatively low temperature from the opening 28 of the duct 26 and the hot air passed through the vent space 27. In this manner, warm air is blown from the ports 30 into the room, so that the room is heated by the warm air. The high temperature air below the duct 26 flows toward the front of the heater along with the warm air stream diffused from the ports 30. Then, the warm air from the ports 30 and the high temperature air stream flowing from the portion below the plate 29 into the room are combined. Thus, the warm air of even high temperature is supplied into the room, thereby effectively heating the room.

In the embodiment described above, the blower motor 20 sucks the air in the room through the louver 24. However, the blower motor 20 may be constructed to suck the fresh air from outside of the room to simultaneously exchange the air into the room. In other words, the suction manifold 21 mounted on the blower motor 20 is directed toward the back surface of the body 2. Further a suction hose (not shown) may be introduced from the exterior of the room into the room. In this case, the end of the hose in the room may be introduced through the back plate of the body 2 into the body 2 to communicate with the suction manifold 21. In this manner, the air blown from the opening 28 of the duct 26 into the room by the operation of the blower motor 20 may become fresh air from outside of the room. In this manner, warm wind is blown from the ports 30 to heat the room with the warm wind and to simultaneously exchange the air in the room with the fresh air from outside of the room.

As described above in the present invention, since the combustion exhaust gas from the combustion equipment can be smoothly raised, the combustion in the combustion equipment can be stabilized, thereby eliminating incomplete combustion of fuel. On the other hand, the air from the air duct and the high temperature air from the upper portion of the heater are mixed to allow the warm air to be blown from the air flowing ports into the room, thereby effectively heating the room with the warm air.

What we claim is:

1. A warm air blowing heater comprising:

combustion equipment for burning fuel to produce hot air;

a body of box shape for housing said combustion equipment, said body including a front surface having a front opening and an upper surface having a portion directly above said combustion equipment;

a reflecting member provided behind said combustion equipment for reflecting combustion heat from said combustion equipment forwards;

blowing means provided adjacent to the upper surface of said body away from the portion of said upper surface directly above said combustion equipment, said blowing means comprising an air duct which has an air blowing opening, said air duct extending laterally to said combustion equipment along the front surface of said body and being fixedly suspended at the upper surface of said body but substantially spaced therefrom to form a vent space therewith, said blowing means being adapted for blowing relatively cool air from elsewhere in said body so as to draw the hot air from the upper portion of said body toward the front surface of the heater through said vent space and to mix the relatively cool air from elsewhere in said body with the hot air from the upper portion of said body; and air supply means connected to said blowing means for supplying the relatively cool air thereto.

2. The heater according to claim 1, which further includes wind direction control plates controlling the direction of a wind blown from said air blowing opening and arranged in said air duct.

3. The heater according to claim 2, which further includes an air blowing plate having a plurality of slit-shaped air blowing ports perforated therethrough and arranged at the front of said air blowing opening of said air duct and said vent space.

4. The heater according to claim 3, which further includes wind direction control plates controlling the direction of a wind blown from said air blowing opening and arranged in said air duct.

5. The heater according to claim 2, wherein said air supply means comprises a blower motor, a suction manifold, and an exhaust manifold connected to said blowing means.

6. The heater according to claim 5, wherein said suction manifold is opened toward the front surface of said heater, and said blower motor serves to suck ambient air and to supply it to said blowing means.

7. The heater according to claim 5, wherein said suction manifold serves to suck the outside air and to supply it to said blowing means.

* * * * *